United States Patent
Lu et al.

(10) Patent No.: US 9,443,064 B2
(45) Date of Patent: Sep. 13, 2016

(54) PROTECTING METHOD AND SYSTEM OF JAVA SOURCE CODE

(75) Inventors: Zhou Lu, Haidian District (CN); Huazhang Zu, Haidian Distict (CN)

(73) Assignee: Feitian Technologies Co., Ltd. (CN)

( * ) Notice: Subject to any disclaimer, the term of this patent is extended or adjusted under 35 U.S.C. 154(b) by 250 days.

(21) Appl. No.: 14/117,987

(22) PCT Filed: Aug. 27, 2012

(86) PCT No.: PCT/CN2012/080616
§ 371 (c)(1),
(2), (4) Date: Nov. 15, 2013

(87) PCT Pub. No.: WO2013/044709
PCT Pub. Date: Apr. 4, 2013

(65) Prior Publication Data
US 2014/0195824 A1    Jul. 10, 2014

(30) Foreign Application Priority Data
Sep. 26, 2011 (CN) .......................... 2011 1 0288519

(51) Int. Cl.
| | |
|---|---|
| G06F 11/30 | (2006.01) |
| G06F 21/10 | (2013.01) |
| G06F 21/50 | (2013.01) |
| G06F 21/12 | (2013.01) |

(52) U.S. Cl.
CPC .............. *G06F 21/10* (2013.01); *G06F 21/123* (2013.01); *G06F 21/50* (2013.01)

(58) Field of Classification Search
CPC ............................ G06F 21/123; G06F 21/50
USPC ........................................................ 713/190
See application file for complete search history.

(56) References Cited

U.S. PATENT DOCUMENTS

| | | | | |
|---|---|---|---|---|
| 8,843,766 B2 * | 9/2014 | Schwarz | ............... | G06F 21/554 380/277 |
| 2003/0195856 A1 * | 10/2003 | Bramhill | ................ | G06F 21/10 705/57 |
| 2004/0039926 A1 * | 2/2004 | Lambert | ............... | G06F 21/125 713/189 |

(Continued)

FOREIGN PATENT DOCUMENTS

| | | |
|---|---|---|
| CN | 101814124 | 8/2010 |
| CN | 102043932 | 5/2011 |

(Continued)

*Primary Examiner* — Teshome Hailu
(74) *Attorney, Agent, or Firm* — Tarolli, Sundheim, Covell & Tummino LLP (57) ABSTRACT

The present disclosure discloses a protecting method and system of Java source code. When a first initiating class is invoked, the method comprises following steps, wherein the first initiating class is an initiating class of Java program: the first initiating class decrypts first cipher data to obtain a class loader; the class loader reads second cipher data to the memory and decrypts the second cipher data to obtain a first class, wherein the first class is a class run by a Java virtual machine, and the suffix of the first class is .class; the class loader loads a second initiating class to the memory; wherein the second initiating class is an original class in jar packet of the Java program; and the class loader loads the first class to the Java virtual machine so that the Java virtual machine can invoke a main interface in the second initiating class to run the Java program. The present disclosure can protect Java source code and make it difficult to decompile the Java source code.

10 Claims, 5 Drawing Sheets

(56) References Cited

U.S. PATENT DOCUMENTS

| | | | |
|---|---|---|---|
| 2005/0130728 A1* | 6/2005 | Nguyen | G07F 17/32 463/16 |
| 2006/0035707 A1* | 2/2006 | Nguyen | G07F 17/32 463/29 |
| 2010/0205459 A1* | 8/2010 | Schwarz | G06F 21/554 713/190 |
| 2013/0005453 A1* | 1/2013 | Nguyen | G07F 17/32 463/29 |

FOREIGN PATENT DOCUMENTS

| | | |
|---|---|---|
| CN | 102360412 | 2/2012 |
| JP | 2008-252798 | 10/2008 |
| WO | 2006134304 | 12/2006 |

\* cited by examiner

PROTECTING METHOD AND SYSTEM OF JAVA SOURCE CODE

TECHNICAL FIELD

The disclosure relates to software protection field, and specifically, to a protecting method and system of Java source code.

BACKGROUND OF THE DISCLOSURE

Java language is an interpreted language. Java source code is compiled to generate a bytecode file and the generated bytecode file is interpreted and executed in a Java virtual machine. Because the bytecode file has strong self-description, a lot of symbols and compiling information are kept, which results in that Java source code can be easily decompiled to source code which has strong readability, therefore, gains obtained by working of developers might be plagiarized or product of developers might be tampered. With the popularization of Java language, Java is applied widely in many field, the requirement for protecting Java source code becomes more and more urgent.

In the prior art, Java source code is generally protected by obfuscating code executing flow or hiding key information, which makes the decompiled code difficult to understand and makes the cost of cracking the source code to increase. However, with the development of the anti-obfuscation technology, purpose of protection can not be achieved by obfuscation effectively.

For the problem that Java source code can be easily decompiled in related art, no effective solution is provided at present.

SUMMARY OF THE DISCLOSURE

The purpose of the present disclosure is providing a protecting method and system of Java source code so as to solve problem that Java source code can be easily decompiled.

In order to reach the purpose above, according to one aspect of the present disclosure, a protecting method of Java source code is provided.

According to the protecting method of Java source code, when a first initiating class is invoked, the method comprises following steps, wherein the first initiating class is an initiating class of Java program: S1, the first initiating class reading first cipher data to a memory, decrypting the first cipher data to obtain first plain data, and defining the first plain data as a class loader, wherein the first cipher data is data obtained by encrypting the bytecode file of the class loader; S2, the class loader reading second cipher data to the memory, decrypting the second cipher data to obtain second plain data, and defining the second plain data as a first class, wherein the first class is a class which is run by a Java virtual machine, and the suffix of the first class is .class; the second cipher data is obtained by encrypting the bytecode file of the first class; and S3, the class loader loading a second initiating class to the memory, wherein the second initiating class is an original class in jar packet of Java program; S4, the class loader loading the first class to the Java virtual machine so that the Java virtual machine can invoke a main interface in the second initiating class, and run the Java program.

Further, step S1 comprises: S11, the first initiating class reading the first cipher data to the memory; S12, the first initiating class loading a local first dynamic library to the memory; S13, the first initiating class invoking a third interface in the first dynamic library; S14, the first initiating class transferring the address of the first cipher data in the memory into the third interface in the first dynamic library; S15, the third interface in the first dynamic library decrypting the first cipher data to obtain the first plain data; and S16, the third interface in the first dynamic library invoking a define class interface of the Java virtual machine to define the first plain data as the class loader.

Further, step S11 comprises: S111, invoking a first interface in the first initiating class; S112, the first interface in the first initiating class invoking a second interface in the first initiating class; and S113, the second interface in the first initiating class reading the first cipher data to the memory.

Further, step S3 comprises: S31, the third interface in the first dynamic library invoking a fourth interface in the class loader; S32, the fourth interface in the class loader reading a configuration file in jar packet of the Java program; S33, the fourth interface in the class loader reading out the second initiating class from the configuration file; S34, the fourth interface in the class loader invoking a fifth interface in the class loader; and S35, the fifth interface in the class loader loading the second initiating class to the memory.

Further, step S2 comprises S21, the fifth interface of the class loader invoking a sixth interface in the class loader; S22, the sixth interface in the class loader reading the second cipher data to the memory; S23, the fifth interface in the class loader decrypting the second cipher data to obtain second plain data; and S24, the fifth interface in the class loader invoking the define class interface of the Java virtual machine and defining the second plain data as the first class.

Further, decrypting the first cipher data and the second cipher data in the following ways: S2001, invoking a dongle interface to search whether a dongle exists; S2002, when the dangle is found by searching, invoking the dongle interface to transfer the cipher data into the dongle; S2003, invoking the dongle interface to use the key stored in the dongle to decrypt the cipher data transferred in to obtain plain data; and S2004, invoking the dongle interface to obtain the plain data.

In order to reach purpose above and according to one aspect of the present disclosure, a protecting system of Java source code is provided.

The protecting system of Java source code according to the present disclosure comprises: a first processing module comprising a first initiating class, wherein the first initiating class is an initiating class of Java program; an invoking module configured to invoke the first initiating class; a second processing module comprising a class loader; an encrypting module configured to encrypt the bytecode file of the class loader to first cipher data and encrypting a bytecode file of a first class to second cipher data, wherein the first class is a class run by a Java virtual machine; and a decrypting module configured to decrypt the first cipher data to first plain data and decrypt the second cipher data to second plain data, wherein the first initiating class is configured to read the first cipher data to the memory, and control the decrypting module to decrypt the first cipher data to obtain the first plain data and define the first plain data as the class loader; the class loader is configured to load a second initiating class to the memory, read the second cipher data to the memory, control the decrypting module to decrypt the second cipher data and load the first class to the Java virtual machine so that the Java virtual machine can invoke a main interface of the second initiating class to run the Java program, wherein the second initiating class is an original class of jar packet of the Java program.

Further, the first initiating class is further configured to load a local first dynamic library to the memory, invoke a third interface in the first dynamic library and transfer the address of the first cipher data in the memory into the third interface in the first dynamic library; wherein the third interface in the first dynamic library is configured to decrypt the first cipher data to obtain the first plain data, and invoke a define class interface of the Java virtual machine to define the first plain data as the class loader.

Further, the first initiating class comprises a first interface and a second interface; the first interface in the first initiating class is configured to invoke the second interface in the first initiating class; the second interface in the first initiating class is configured to read the first cipher data to the memory.

Further, the class loader includes a fourth interface and a fifth interface, wherein the fourth interface of the class loader is configured to read a configuration file in the jar packet of the Java program, read the second initiating class out from the configuration file and invoke the fifth interface in the class loader; the fifth interface in the class loader is configured to load the second initiating class to the memory; and the third interface in the first dynamic library is further configured to invoke the fourth interface in the class loader.

Further, the class loader comprises a sixth interface, wherein the sixth interface in the class loader is configured to read the second cipher data to the memory; and the fifth interface in the class loader is further configured to invoke the sixth interface in the class loader, decrypt the second cipher data to obtain the second plain data, and invoke the define class interface of the Java virtual machine to define the second plain data as the first class.

Further, the decrypting module comprises: a second searching sub-module configured to invoke a dongle interface to search whether a dangle exists; a second transferring-in sub-module, configured to, when the dongle is found by searching, invoke the dongle interface to transfer the cipher data into the dongle; a first decrypting sub-module, configured to invoke the dangle interface to use the key stored in the dongle to decrypt the cipher data transferred in to obtain plain data; and a third obtaining sub-module, configured to invoke the dongle interface to obtain the plain data.

When a first initiating class, i.e. initiating class of Java program, is invoked, the present disclosure provides a protecting method of Java source code including following steps: S1, the first initiating class reads first cipher data to a memory, decrypt the first cipher data to obtain first plain data, and define the first plain data as a class loader, wherein the first cipher data is data obtained by encrypting the bytecode file of the class loader; S2, the class loader reads second cipher data to the memory, decrypt the second cipher data to obtain second plain data, and define the second plain data as a first class, wherein the first class is a class run by a Java virtual machine, and the suffix of the first class is .class, the second cipher data is data obtained by encrypting the bytecode file of the first class; S3, the class loader loads the second initiating class to the memory, wherein the second initiating class is an original class in jar packet of Java program; and S4, the class loader loads the first class to the Java virtual machine so that the Java virtual machine can invoke a main interface in the second initiating class to run the Java program, the present solves problem that Java source code can be easily decompiled and protection of Java source code is realized.

BRIEF DESCRIPTION OF THE DRAWINGS

The accompanying drawings are included to provide a further understanding of the present disclosure and are incorporated in and constitute a part of this specification; the illustrated embodiments of the present disclosure, together with the description, serve to explain the principles of the present disclosure and are not be comprehended as constituting any limitation on the present disclosure. In the accompanying drawings.

DETAILED DESCRIPTION OF THE PRESENT INVENTION

It should be noted that the embodiments in the present application and the characteristics of the embodiments can be combined if no conflict is caused. The present disclosure is described below in detail by reference to the accompanying drawings in conjunction with embodiments.

Embodiment 1

Figure 1:
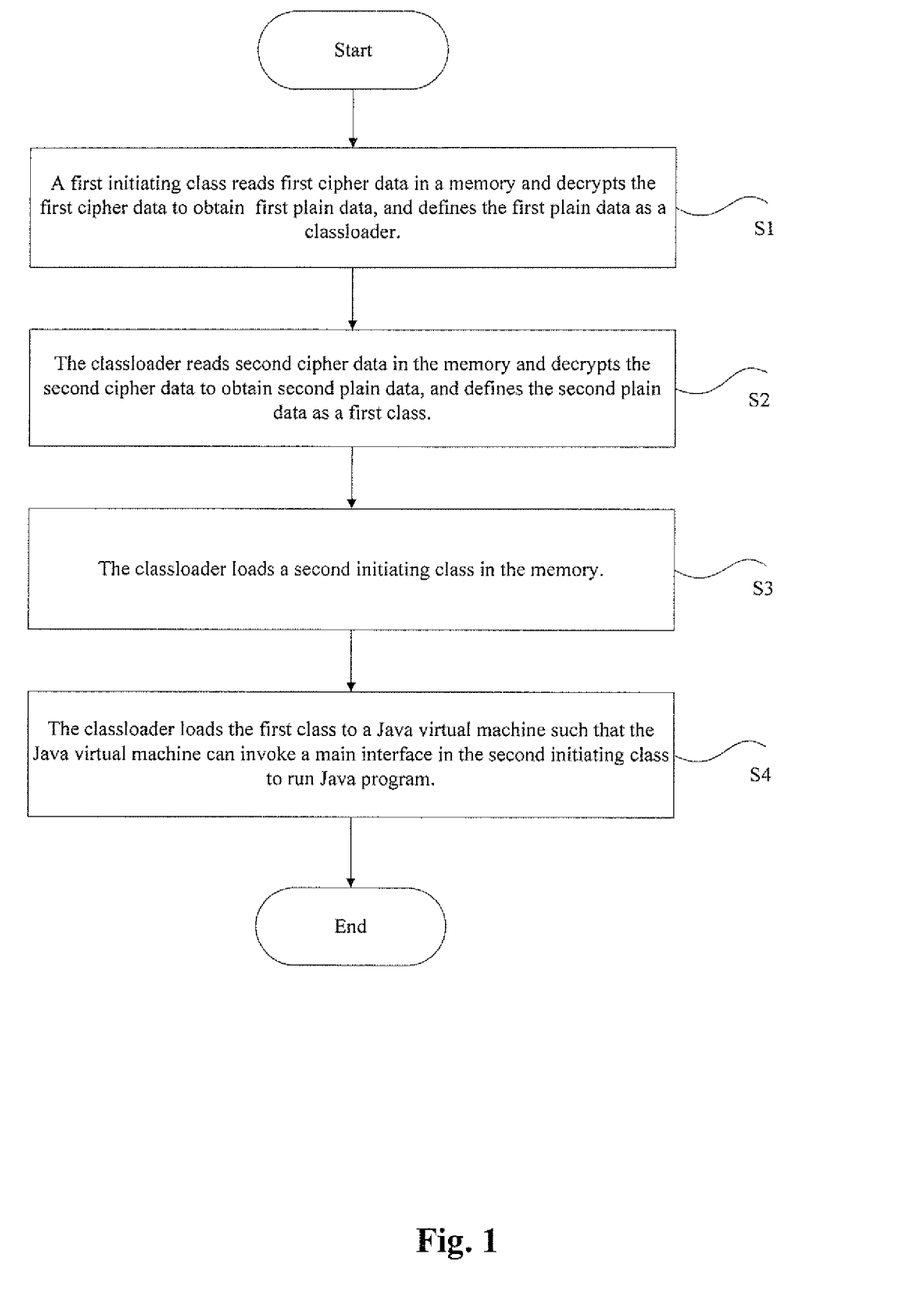
FIG. 1 shows a protecting method of Java source code provided by Embodiment 1.

FIG. 1 shows a protecting method of Java source code provided by embodiment 1; when a initiating class of a Java program, that is a first initiating class is invoked, and as shown by FIG. 1, the protecting method includes following step S1 to step S4:

S1, a first initiating class reads first cipher data to a memory, decrypts the first cipher data to obtain first plain data and defines the first plain data as a class loader; in this case the first cipher data is obtained by encrypting a bytecode file of the class loader;

S2, the class loader reads second cipher data in the memory, decrypts the second cipher data to obtain second plain data and defines the second plain data as a first class; in this case the first class is a class executed by a Java virtual machine and its suffix is .class, the second cipher data is obtained by encrypting a bytecode file of the first class;

S3, the class loader loads a second initiating class in the memory; in this case the second initiating class is an original initiating class in jar packet of Java program;

S4, the class loader loads the first class to the Java virtual machine in such way that the Java virtual machine can invoke a main interface in the second initiating class and execute the Java program.

In the present embodiment, the Java program is protected by using the class loader and the class loader is encrypted so that an attacker can not obtain the class loader of plain text, which effectively prevents the source code from being decompiled and protects the Java source code.

Preferably, step S1 includes following step S11 to step S16:

S11, the first initiating class reads the first cipher data to the memory.

S12, the first initiating class loads a local first dynamic library to the memory.

S13, the first initiating class invokes a third interface in the first dynamic library.

S14, the first initiating class transfers the address of the first cipher data in the memory to the third interface in the first dynamic library.

S15, the third interface in the first dynamic library decrypts the first cipher data to obtain first plain data.

S16, the third interface in the first dynamic library invokes the define class interface of a Java virtual machine to define the first plain data as the class loader.

In a preferred embodiment of the step S1, the process that the first initiating class decrypts the first cipher data is realized in a local dynamic library and the local dynamic library is invoked by jni technology. In this way, decrypting the class loader is completed in the local dynamic library. Due to natural barrier of local code, it is very difficult to decompile Java source code, further, the Java source code is prevented from being decompiled and the Java source code is better protected.

In order to further protect the Java source code, preferably, in the step S11, the first initiating class includes a first interface and a second interface, and sets an intermediate conversion interface in the process of reading the first cipher data to the memory; Step S11 includes following step S111 to step S113:

S111, invoke the first interface in the first initiating class.

S112, the first interface in the first initiating class invokes the second interface in the first initiating class.

S113, the second interface in the first initiating class reads the first cipher data to the memory.

In order to further protect Java source code, preferably, step S3 includes following step S31 to step S35:

S31, the third interface in the first dynamic library invokes a fourth interface in the class loader.

S32, the fourth interface in the class loader reads configuration file in the jar packet of Java program.

S33, the fourth interface in the class loader reads the second initiating class from the configuration file.

S34, the fourth interface in the class loader invokes a fifth interface in the class loader.

S35, the fifth interface in the class loader loads the second initiating class to the memory.

In order to further protect the Java source code, preferably, step S2 includes step S21 to step S24.

S21, the fifth interface in the class loader invokes a sixth interface in the class loader.

S22, the sixth interface in the class loader reads second cipher data to the memory.

S23, the fifth interface in the class loader decrypts the second cipher data to obtain second plain data.

S24, the fifth interface in the class loader invokes the define class interface of the Java virtual machine and defines the second plain data as a first class.

In the embodiment 1, the class loader and the first class data is encrypted by following two ways.

Figure 2:
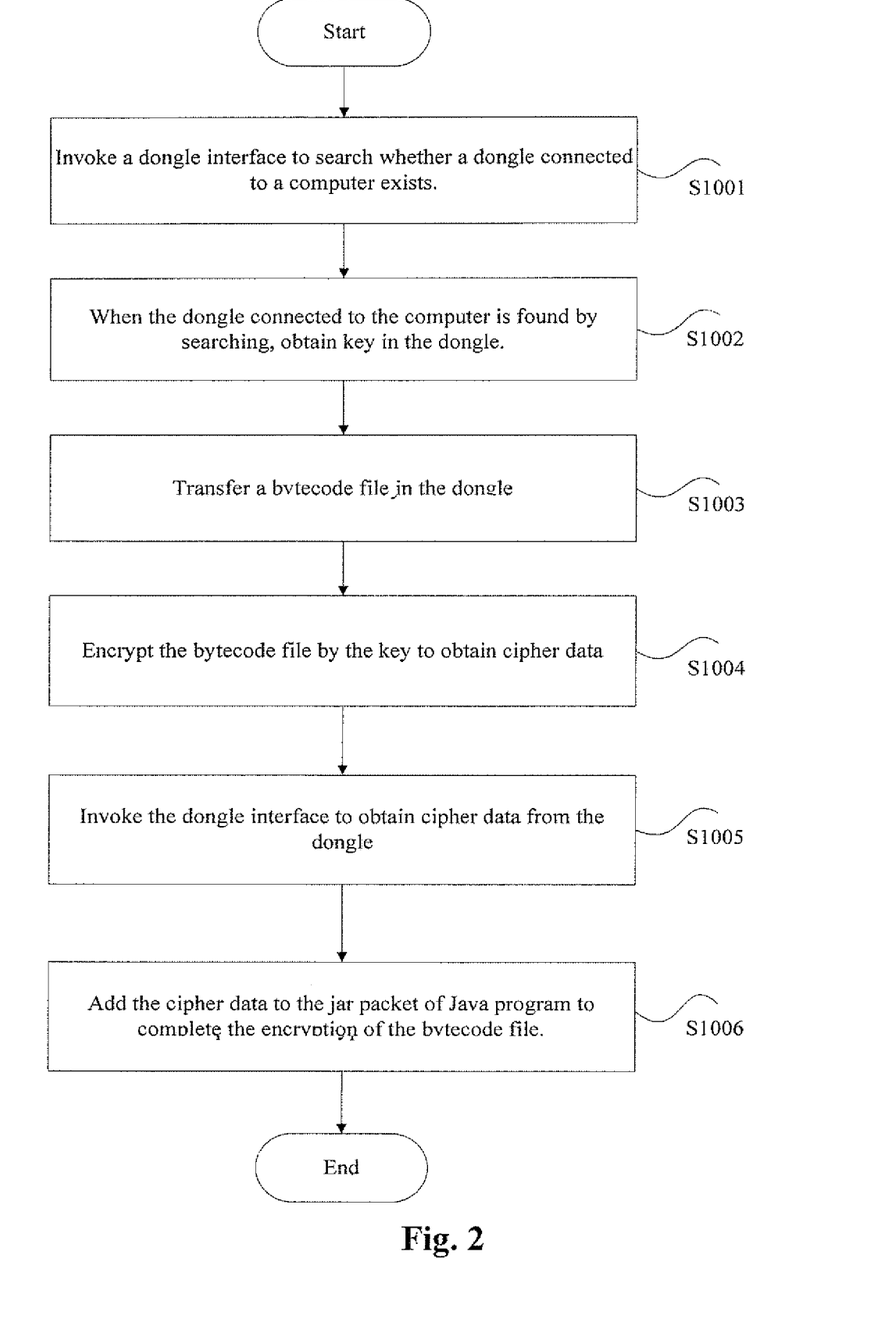
FIG. 2 shows an encrypting method in the protecting method of Java source code provided by Embodiment 1.

The first method is hardware encryption. FIG. 2 shows a flow chart of the encrypting method, which includes following step S1001 to step S1006:

S1001, invoke a dongle interface to search for whether a dangle is connected to a computer.

S1002, when a dongle connected to the computer is found by searching, obtain a key in the dongle; in this case the key can be generated temporarily in the dongle or a preset key in the dongle is obtained directly.

S1003, transfer a bytecode file into the dongle, here the bytecode file refers to a bytecode file of the class loader or a bytecode file of the first class.

S1004, encrypt the bytecode file by the key to obtain cipher data.

S1005, invoke the dongle interface to obtain the cipher data from the dongle.

S1006, add the cipher data to the jar packet of java program to complete encrypting the bytecode file.

Figure 3:
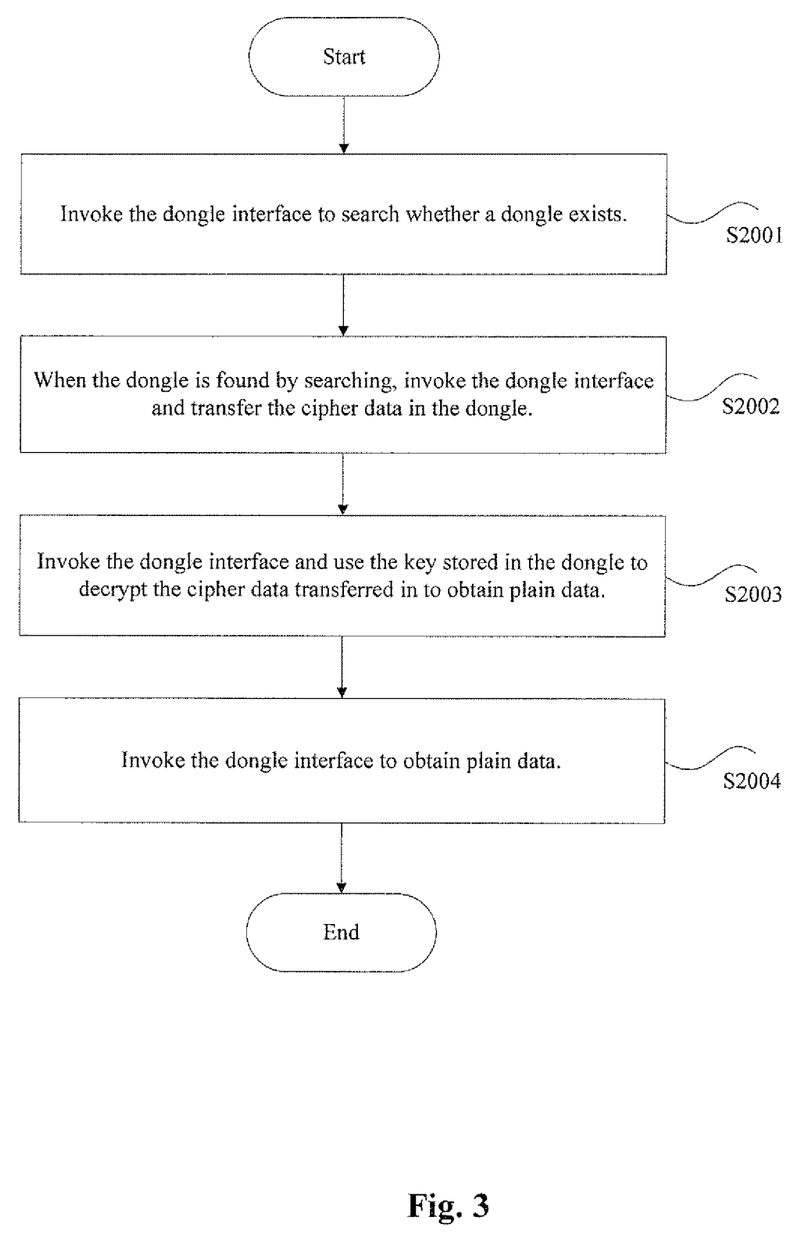
FIG. 3 shows a decrypting method in the protecting method of Java source code provided by Embodiment 1.

Correspondingly, decryption is implemented with a decryption method shown in FIG. 3. As shown by FIG. 3, the method includes following step S2001 to step S2004:

S2001, invoke dongle interface to search for whether a dongle exists.

S2002, when the dongle is found by searching, invoke the dongle interface and transfer the cipher data into the dongle.

S2003, invoke the dongle interface to decrypt the cipher data transferred in by using the key stored in the dongle to obtain plain data.

S2004, invoke the dongle interface to obtain the plain data.

Because a hardware dongle is necessary for decryption, and the key exists in the hardware dongle, it is impossible to find decryption algorithm, the way of hardware encryption has high security intensity and can provide high intensity protection for the java source code, The second method is software encryption, which includes following step S1001' to step S1003'.

S1001', obtain a predetermined key or a key which is generated temporarily; the key is fixed, S1002', use the key to encrypt the bytecode file by an encryption algorithm to obtain cipher data; in this case the encryption algorithm is fixed, and preferably is, but not limited to, 3DES.

S1003', add the encrypted bytecode file to the jar packet of the java program.

Correspondingly, decryption can be performed by invoking a decryption algorithm stored in the local dynamic library with the third interface and plain data is obtained by successful decryption.

For the hardware encryption, unless an attacker may decompile the local dynamic library and obtain the decryption algorithm, java source code can not be decompiled. Because of the natural barrier of local code, it is hard to obtain the decryption algorithm.

Embodiment 2

The embodiment provides a protecting method of java source code. When java program is run, in the condition that the java program is protected already, corresponding decryption operation is performed; only if the decryption is performed can the java program be run, in the condition that the java program has not been protected, the java program can be run directly.

Figure 4:
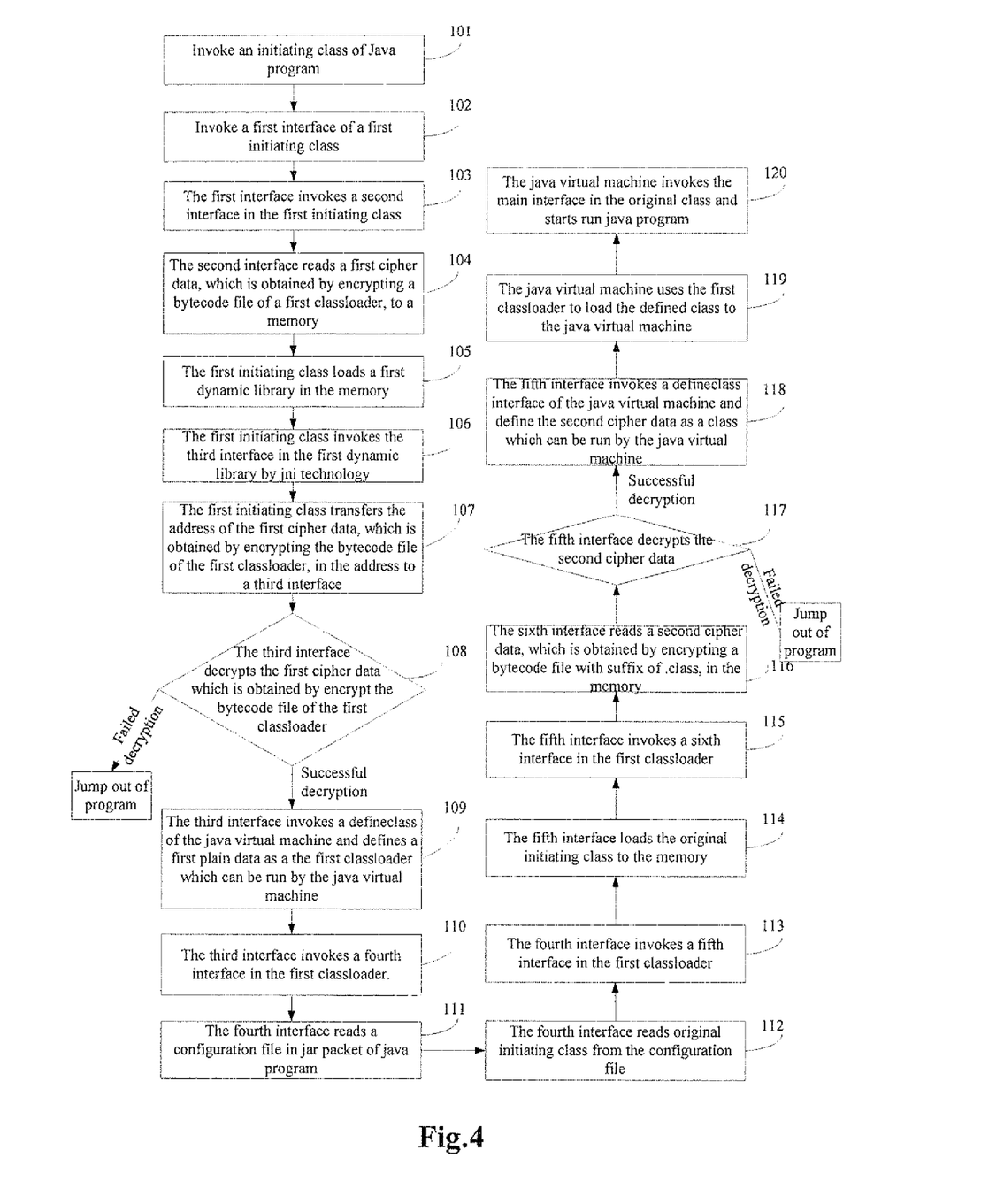
FIG. 4 shows a protecting method of Java source code provided by Embodiment 2.

Referring to FIG. 4, the protecting method includes:

Step 101, invoke initiating class of the java program;

Specifically, in the present embodiment, operating system of a computer invokes javaw.exe initiating program; the javaw.exe initiating program builds a java virtual machine in the memory; the computer operating system takes the path of jar packet of the java program as reference and transfers the reference into the javaw.exe initiating program, for example, javaw-jar example.jar;

The javaw.exe initiating program reads an initiating class from a configuration file of the jar packet of the Java program, when the java program is a protected program, the configuration file has been amended;

Specifically, in the present embodiment, a first field has been preset in the configuration file, the initiating class in the original configuration file is stored in the first field; meanwhile, the initiating class in the configuration file is modified as the first initiating class;

Correspondingly, in the step 101 of the present embodiment, the initiating class of the invoked java program is a first initiating class and the first initiating class is written by java language;

Step 102, invoke a first interface in the first initiating class;

Specifically, in the present embodiment, the first interface is main method in the first initiating class;

Step 103, the first interface invokes a second interface in the first initiating class;

Specifically, in the present embodiment, the second interface is read file method in the first initiating class; and Step 104, the second interface reads first cipher data, which is obtained by encrypting a bytecode file of a first class loader, to the memory;

Specifically, in the present embodiment, the first class loader is written by java language; the bytecode file of the first class loader is encrypted in advance; the encryption process specifically is implemented by hardware encryption or software encryption.

The hardware encryption is realized by interactive operation between a hardware dangle and a computer, which is specifically as the following:

Step 1001, an encryption program invokes a dongle interface to search for whether a dongle is connected to the computer, if yes, go to step 1002; otherwise, go on searching;

Step 1002, the encryption program invokes the dongle interface, generates a key in the dongle and stores the key;

Specifically, in the present embodiment, the key can be obtained in another way, i.e. importing the key to the dongle, and the key is fixed;

Step 1003, the encryption program transfers the bytecode file of the first loader into the hardware dongle;

Step 1004, the encryption program invokes the dongle interface to encrypt the bytecode file of the first class loader transferred in by using the generated key to obtain first cipher data;

Step 1005, the encryption program invokes the dongle interface and obtains the first cipher data from the hardware dongle;

Step 1006, the encryption program receives the first cipher data and writes the first cipher data into the bytecode file; and Step 1007, the computer adds the encrypted bytecode file to jar packet of the java program so as to complete the encryption of the bytecode file of the first class loader;

The software encryption specifically includes following steps:

Step 1001', the encryption program presets a key;

Specifically, in the present embodiment, the key is fixed;

The key can be obtained by another way, i.e. the encryption program generates a key temporarily;

Step 1002', the encryption program uses the key to encrypt the bytecode file of the first class loader by an encryption algorithm to obtain first cipher data;

Specifically, in the present embodiment, the encryption algorithm is fixed;

Preferably, in the present embodiment, the algorithm is, but not limited to, 3DES algorithm;

Correspondingly, the first dynamic library realizes decryption algorithm;

Step 1003', the computer adds the encrypted bytecode file of the first class loader to the jar packet of the java program;

Specifically, in the step 104 of the present embodiment, the process of reading the bytecode file of the first class loader to the memory is reading the file in arrays of the memory in the form of data flow;

A lot of arrays are set in the memory, for example, byte0[ ], byte1[ ], byte2[ ], byte3[ ], and the like. Preferably, the encrypted bytecode file of the first class loader is read in the array byte0[ ] of the memory;

Step 105, the first initiating class loads the first dynamic library to the memory;

Specifically, in the present embodiment, the first dynamic library is written by standard C language; the first dynamic library is added to the jar packet of the java program in advance;

Step 106, the first initiating class invokes a third interface in the first dynamic library by jni technology;

Specifically, in the present embodiment, the third interface is run method in the first dynamic library;

Step 107, the first initiating class transfers the address of the first cipher data, which is obtained by encrypting the bytecode file of the first class loader, in the memory into the third interface;

Specifically, in the present embodiment, the address of the array byte0[ ] in the memory is transferred into the third interface; the third interface invokes corresponding data in the array byte0[ ] according to the address reference which are transferred in;

Step 108, the third interface decrypts the first cipher data, which is obtained by encrypting the bytecode file of the first class loader; if the decrypting is successful, go to step 109; if the decrypting is failed, jump out of the program;

Specifically, in the present embodiment, the first plain data is obtained after successful decryption;

Corresponding to the encryption process of the step 104, corresponding decryption process is realized by hardware decryption or software decryption.

Hardware encryption specifically includes following steps.

Step 2001, the third interface invokes the dongle interface to search for whether a dongle is connected to the computer, if yes, go to step 2002; otherwise, go on searching;

Step 2002, the third interface invokes the dongle interface and transfers the first cipher data into the hardware dangle;

Step 2003, the third interface invokes the dangle interface to decrypt the first cipher data transferred in by using the key which is stored in the hardware dongle in encrypting process; if the decrypting is successful, go to step 2004; if the decrypting is failed, jump out of the program;

Specifically, in the present embodiment, first plain data is obtained after successful decrypting; and Step 2004, the third interface invokes the dongle interface to obtain the first plain data obtained by decrypting.

Software decryption is specifically as the following:

The third interface directly invokes the decryption algorithm in the first local dynamic library and decrypts the first cipher data, if the decrypting is successful, go to step 109, if the decrypting is failed, jump out of the program;

specifically, in the present embodiment, first plain data is obtained after successful decrypting;

Step 109, the third interface invokes a define class interface of a java virtual machine and uses the define class interface to define the first plain data obtained by decrypting the first cipher data as a first class loader which can be run by the java virtual machine;

specifically, in the present embodiment, the define class interface is define class method.

Step 110, the third interface invokes a fourth interface in the first class loader;

Specifically, in the present embodiment, the fourth interface is run main method in the first class loader;

Step 111, the fourth interface reads out the configuration file in jar packet of the Java program;

Step 112, the fourth interface reads out an original initiating class from the configuration file;

Specifically, in the present embodiment, the original initiating class is the initiating class saved in the first field in the configuration file;

Step 113, the fourth interface invokes a fifth interface in the first class loader;

Specifically, in the present embodiment, the fifth interface is loadclass method in the first class loader;

Step 114, the fifth interface loads the original class to the memory;

In the present embodiment, step 110 to step 114 can be executed after any step between step 109 and step 120;

Step 115, the fifth interface invokes a sixth interface in the first class loader;

Specifically, in the present embodiment, the sixth interface is readfile method in the first class loader;

Step 116, the sixth interface reads second cipher data which is obtained by encrypting the bytecode file with suffix of .class to the memory;

Specifically, in the present embodiment, the java program is protected, and correspondingly, the bytecode file with suffix of .class in the jar packet of the java program is an encrypted file;

The way of encrypting the bytecode file with suffix of .class is the same as the way of encryption in the step 104 and it is unnecessary to go into details here.

The jar packet of the java program has a plurality of encrypted bytecode files, i.e. there are a plurality of second cipher data; when the java program is run, the java virtual machine reads one of the second cipher data as needed, and reads the second cipher data, which is obtained by encrypting the bytecode file with suffix of .class by the fifth interface, in the memory.

Specifically, the process of reading the data to the memory is reading the data in an array of the memory in the form of data flow;

there are a plurality arrays in the memory, for example, byte0[ ], byte1[ ], byte2[ ], byte3[ ], etc. Preferably, the second cipher data obtained by encrypting the bytecode file with suffix of .class in the array byte1[ ] of the memory;

Step 117, the fifth interface decrypts the second cipher data which is obtained by encrypting the bytecode file with suffix of .class, if decrypting is successful, go to step 118; if decrypting is failed, jump out of the program;

Specifically, in the present embodiment, the way of decrypting the second cipher data which is obtained by encrypting the bytecode file with suffix of .class is the same as the way of decrypting in above step 108, it is unnecessary to go into details here;

Correspondingly, second plain data is obtained after successful decrypting.

Step 118, the fifth interface invokes a define class interface of the java virtual machine and the define class interface defines the second plain data, which is obtained by decrypting the second cipher data obtained by encrypting the bytecode file with suffix of .class, as a class that can be used by the java virtual machine;

Specifically, in the present embodiment, the define class interface is defineclass method;

Step 119, the java virtual machine uses the first class loader to load the defined class to the java virtual machine; and Step 120, the java virtual machine invokes standard main interface in the original initiating class and starts to run the java program.

Specifically, in the present embodiment, the standard main interface is main method in the original initiating class.

Embodiment 3

Figure 5:
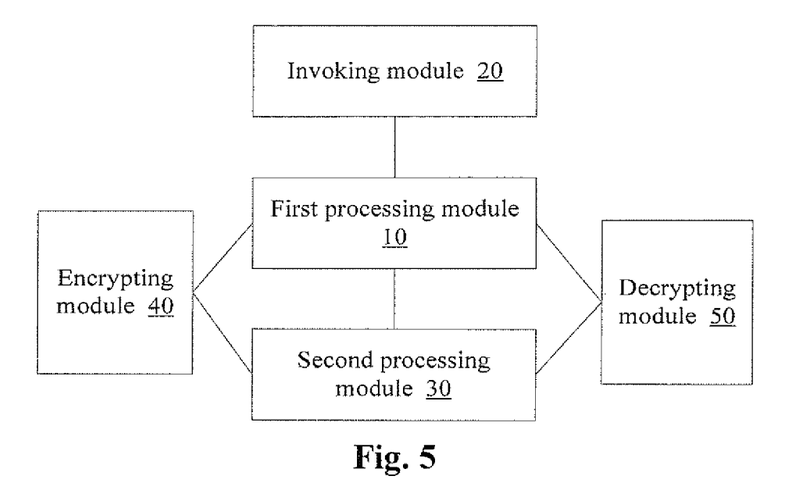
FIG. 5 shows a protecting system of Java source code provided by Embodiment 3.

FIG. 5 shows a protecting system of Java source code provided by embodiment 4. As shown by FIG. 5, the system includes:

a first processing module 10 including a first initiating class, wherein the first initiating class is an initiating class of Java program;

an invoking module 20 configured to invoke the first initiating class;

a second processing module 30 including a class loader;

an encrypting module 40 configured to encrypt a bytecode file of the class loader to first cipher data and encrypt a bytecode file of a first class to second cipher data, wherein the first class is a class run by a Java virtual machine; and a decrypting module 50 configured to decrypt the first cipher data to first plain data and decrypt the second cipher data to second plain data.

In this case the first initiating class reads the first cipher data to the memory, controls the decrypting module 50 to decrypt the first cipher data to obtain the first plain data and define the first plain data as the class loader;

The class loader is configured to load a second initiating class to the memory, read the second cipher data to the memory, control the decrypting module 50 to decrypt the second cipher data, and load the first class to the Java virtual machine so that the Java virtual machine invokes the main interface in the second initiating class to run the Java program; in this case the second initiating class is an original initiating class in jar packet of the Java program.

In the present embodiment, the invoking module 20 invokes the first processing module 10, i.e. the first initiating class. Because the class loader is encrypted by the encrypting module 40, the first initiating class controls the decrypting module 50 to decrypt the first cipher data to obtain the second processing module 30, i.e. the class loader; because the first class is encrypted by the encrypting module 40, the class loader controls the decrypting module 50 to decrypt the second cipher data to obtain the first class; the class loader loads the second initiating class to the Java virtual machine so that the Java virtual machine can invoke the main interface of the second initiating class to run the Java program. Using the class loader to protect the java program and encrypting the class loader so that an attacker can not obtain the class loader of plain text; therefore decompiling the source code is prevented effectively and the Java source code is protected.

In this case, in order to further protect Java source code, the process that the first initiating class controls the decrypting module 50 to decrypt the first cipher data is realized in the local dynamic library; preferably, the first initiating class is further configured to load a local first dynamic library to the memory, invoke a third interface in the first dynamic library and transfer the address of the first cipher data in the memory to the third interface in the first dynamic library, in this case, the third interface in the first dynamic library is configured to decrypt the first cipher data to obtain the first plain data and invoke a define class interface of the Java virtual machine to define the first plain data as class loader.

In order to further protect Java source code, preferably, the first initiating class includes a first interface and a second interface; the first interface in the first initiating class is configured to invoke the second interface in the first initiating class; the second interface in the first initiating class is configured to read the first cipher data to the memory.

In order to further protect Java source code, preferably, the class loader includes a fourth interface and a fifth interface; in this case, the fourth interface in the class loader is configured to read a configuration file in jar packet of the Java program, read out the second initiating class from the configuration file and invoke the fifth interface in the class loader; the fifth interface in the class loader is configured to load the second initiating class to the memory; and the third interface in the first dynamic library is configured to invoke the fourth interface in the class loader.

In order to further protect Java source code, preferably, the class loader includes a sixth interface, in this case, the sixth interface in the class loader is configured to read the second cipher data to the memory; and the fifth interface in the class loader is further configured to invoke the sixth interface in the class loader, decrypt the second cipher data to obtain the second plain data and invoke the define class interface of the Java virtual machine to define the second plain data as the first class.

Preferably, a hardware dongle is used to encrypt the first class or the class loader. The encrypting module 40 includes: a first searching sub-module configured to invoke a dongle interface to search for whether a dongle is connected to the computer; a first obtaining sub-module configured to, when the dongle is found by searching, obtain a key in the dongle; a first transferring-in sub-module configured to transfer the bytecode file into the dongle; a first encrypting sub-module configured to invoke the dongle interface and use the key to encrypt the bytecode file to obtain the cipher data; a second obtaining sub-module configured to invoke the dongle interface to obtain the cipher data from the dongle; and a first adding sub-module configured to add the cipher data to jar packet in the java program to complete encrypting the bytecode file.

Correspondingly, the decrypting module 50 includes: a first searching sub-module configured to invoke the dongle interface to search whether a dongle exists; a second transferring-in sub-module is configured to, when the dongle is found by searching, invoke the dongle interface to transfer the cipher data into the dongle; a first decrypting sub-module configured to invoke the dongle interface and use the key stored in the dongle to decrypt the cipher data transferred in to obtain plain data; and a third obtaining sub-module configured to invoke the dongle interface to obtain the plain data.

Preferably, the first class or the class loader is encrypted by the way of software encryption; the encrypting module 40 includes a fourth obtaining sub-module configured to obtain a key; a second encrypting sub-module configured to use the key to encrypt the bytecode file with an encryption algorithm to obtain cipher data; and a second adding sub-module configured to add the cipher data in the jar packet of the java program to complete encrypting the bytecode file.

Correspondingly, the decrypting module 50 includes a second decrypting sub-module configured to use the key to decrypt the cipher data with a decrypting algorithm to obtain plain data.

Embodiment 4

The present embodiment provides a protecting system of java source code.

Figure 6:
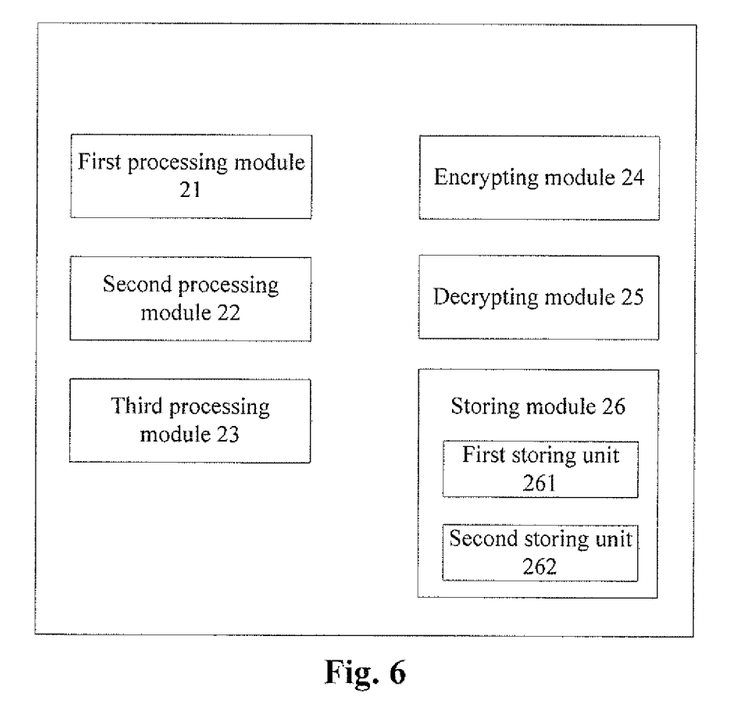
FIG. 6 shows a protecting system of Java source code provided by Embodiment 4.

Referring to FIG. 6, the system includes a first processing module 21, a second processing module 22, a third processing module 23, an encrypting module 24, a decrypting module 25 and a storing module 26.

The first processing module 21, which specifically is a first initiating class, provides a first interface (main method) and a second interface (readfile method), and is configured to be invoked by java program when the java program runs; the first initiating class is written by java language.

The second processing module 22, which specifically is a local first dynamic library, provides a third interface (run method) and configured to be invoked by the java program when the java program runs; the first dynamic library is written by standard C language;

The third processing module 23, which is specifically a first class loader, provides a fourth interface (runmain method), a fifth interface (loadclass method) and a sixth interface (readfile method) which are invoked by the java program when the java program runs; the first class loader is written by java language;

the encrypting module 24 is configured to encrypt the bytecode file of the first class loader in the third processing module 23 to obtain first cipher data;

and the encrypting module 24 is configured to encrypt each bytecode file with suffix of .class in jar packet of the java program to obtain second cipher data;

the decrypting module 25, is configured to decrypt the first cipher data, which is obtained by encrypting the bytecode file of the first class loader in the encrypting module 24, to obtain first plain data;

and the decrypting module 25 is configured to decrypt the second cipher data, which is obtained by encrypting the bytecode file with suffix of .class in the encrypting module 24, to obtain second plain data;

the storing module 26 includes a first storing unit 261 and a second storing unit 262;

the first storing unit 261 is configured to store the bytecode file in the jar packet of the java program;

the bytecode file includes bytecode file with suffix of .class, configuration file and the like.

the first storing unit 261 is configured to store the encrypted bytecode file with suffix of .class in the jar packet of java program;

and the first storing unit 261 is configured to store modified configuration file;

the second storing unit 262 is configured to store a predetermined key and encryption and decryption algorithms.

From what is described above, it can be seen that the embodiment of the present disclosure realizes following technical effect: an encrypted class loader is used to protect the java program and two times of decryption is performed when the java program runs, which prevents an attacker from obtaining the class loader of plain text so as to realize effective protection of Java source code.

It should be noted that steps shown by a flow chart of accompanying drawings can be executed in operating system of a set of computer-executable instructions; and though logic sequence is shown in the flow chart, however, in some situations, the shown or described steps can be executed in a sequence which is different from the above sequence.

Evidently, those skilled in the art shall appreciate that the respective modules or steps of the disclosure may be implemented by a general-purposed computing device and may be integrated on a single computing device or distributed over a network consisted of a plurality of computing devices. Optionally, they may be implemented using program codes executable by the computing device so that they may be stored in a storage device for execution by the computing device or they may be implemented by fabricating them into integrated circuit modules respectively or by fabricating some modules or steps of them into a single integrated circuit module. Thus, the disclosure is not limited to any specific combination of hardware and software.

The foregoing descriptions are merely illustrative of the preferred embodiments of the disclosure but not intended to limit the scope of the disclosure, and various modifications and variations which may be made to the disclosure will occur to those skilled in the art. Any modifications, equivalent alternatives and adaptations in light of the spirit and principle of the disclosure shall fall within the scope of the disclosure

What is claimed is:

1. A protecting method of Java source code, wherein when a first initiating class is invoked, the method comprises:
   S1, the first initiating class reading first cipher data to a memory, decrypting the first cipher data to obtain first plain data, and defining the first plain data as a class loader, wherein the first initiating class is an initiating class of Java program and the first cipher data is data obtained by encrypting the bytecode file of the class loader;
   S2, the class loader reading second cipher data to the memory, decrypting the second cipher data to obtain second plain data, and defining the second plain data as a first class, wherein the first class is a class which is run by a Java virtual machine, and the suffix of the first class is .class, and the second cipher data is obtained by encrypting the bytecode file of the first class;
   S3, the class loader loading a second initiating class to the memory, wherein the second initiating class is an original class in jar packet of Java program; and
   S4, the class loader loading the first class to the Java virtual machine so that the Java virtual machine can invoke a main interface in the second initiating class and run the Java program,
   wherein the step S1 comprises:
   S11, the first initiating class reading the first cipher data to the memory;
   S12, the first initiating class loading a local first dynamic library to the memory;
   S13, the first initiating class invoking a third interface in the first dynamic library;
   S14, the first initiating class transferring an address of the first cipher data in the memory into the third interface in the first dynamic library;
   S15, the third interface in the first dynamic library decrypting the first cipher data to obtain the first plain data; and
   S16, the third interface in the first dynamic library invoking a define class interface of the Java virtual machine to define the first plain data as the class loader.

2. The method of claim 1, wherein the step S11 comprises:
   S111, invoking a first interface in the first initiating class;
   S112, the first interface in the first initiating class invoking a second interface in the first initiating class; and
   S113, the second interface in the first initiating class reading the first cipher data to the memory.

3. The method of claim 1, wherein the step S3 comprises
   S31, the third interface in the first dynamic library invoking a fourth interface in the class loader;
   S32, the fourth interface in the class loader reading a configuration file in jar packet of the Java program;
   S33, the fourth interface in the class loader reading out the second initiating class from the configuration file;
   S34, the fourth interface in the class loader invoking a fifth interface in the class loader; and
   S35, the fifth interface in the class loader loading the second initiating class to the memory.

4. The method of claim 3, wherein the step S2 comprises:
   S21, the fifth interface of the class loader invoking a sixth interface in the class loader;
   S22, the sixth interface in the class loader reading the second cipher data to the memory;
   S23, the fifth interface in the class loader decrypting the second cipher data to obtain second plain data; and
   S24, the fifth interface in the class loader invoking the define class interface of the Java virtual machine and defining the second plain data as the first class.

5. The method of claim 1, wherein decrypting the first cipher data and the second cipher data in the following ways:
   S2001, invoking a dongle interface to search whether a dongle exists;
   S2002, when the dongle is found by searching, invoking the dongle interface to transfer cipher data into the dongle;
   S2003, invoking the dongle interface to use a key stored in the dongle to decrypt the cipher data, which is transferred in, to obtain plain data; and
   S2004, invoking the dongle interface to obtain the plain data.

6. A protecting system of Java source code, executed by a computer device, the computer device comprises a processor and a memory, comprising:
   a first processing module comprising a first initiating class, wherein the first initiating class is an initiating class of Java program;
   an invoking module configured to invoke the first initiating class; and
   a second processing module comprising a class loader;
   an encrypting module configured to encrypt a bytecode file of the class loader to first cipher data and encrypt a bytecode file of a first class to second cipher data, wherein the first class is a class run by a Java virtual machine; and
   a decrypting module configured to decrypt the first cipher data to first plain data and decrypt the second cipher data to second plain data,
   wherein the first initiating class is configured to read the first cipher data to the memory, and control the decrypting module to decrypt the first cipher data to obtain the first plain data and define the first plain data as the class loader; and
   the class loader configured to load a second initiating class to the memory, read the second cipher data to the memory, control the decrypting module to decrypt the second cipher data and load the first class to the Java virtual machine so that the Java virtual machine can invoke a main interface of the second initiating class to run the Java program, wherein the second initiating class is an original class of jar packet of the Java program,
   wherein the first initiating class is further configured to load a local first dynamic library to the memory, invoke a third interface in the first dynamic library and transfer the address of the first cipher data in the memory into the third interface in the first dynamic library,
   wherein the third interface in the first dynamic library is configured to decrypt the first cipher data to obtain the first plain data and invoke a define class interface of the Java virtual machine to define the first plain data as the class loader.

7. The protecting system of claim 6, wherein
   the first initiating class comprises a first interface and a second interface, wherein the first interface in the first initiating class is configured to invoke the second interface in the first initiating class; the second interface in the first initiating class is configured to read the first cipher data to the memory.

8. The protecting system of claim 6, wherein
the class loader comprises a fourth interface and a fifth interface, wherein the fourth interface of the class loader is configured to read a configuration file in the jar packet of the Java program, read the second initiating class out from the configuration file and invoke the fifth interface in the class loader; the fifth interface in the class loader is configured to load the second initiating class to the memory; and
the third interface in the first dynamic library is further configured to invoke the fourth interface in the class loader.

9. The protecting system of claim 8, wherein
the class loader comprises a sixth interface, wherein the sixth interface in the class loader is configured to read the second cipher data to the memory; and
the fifth interface in the class loader is further configured to invoke the sixth interface in the class loader, decrypt the second cipher data to obtain the second plain data, and invoke the define class interface of the Java virtual machine to define the second plain data as the first class.

10. The protecting system of claim 6, wherein the decrypting module comprises:
- a second searching sub-module configured to invoke a dongle interface to search whether a dongle exists;
- a second transferring-in sub-module configured to, when the dongle is found by searching, invoke the dongle interface to transfer cipher data into the dongle;
- a first decrypting sub-module configured to invoke the dongle interface to use the key stored in the dongle to decrypt the cipher data, which is transferred in, to obtain plain data; and
- a third obtaining sub-module configured to invoke the dongle interface to obtain the plain data.

* * * * *

UNITED STATES PATENT AND TRADEMARK OFFICE
CERTIFICATE OF CORRECTION

PATENT NO.       : 9,443,064 B2  
APPLICATION NO.  : 14/117987  
DATED            : September 13, 2016  
INVENTOR(S)      : Zhou Lu et al.

Page 1 of 1

It is certified that error appears in the above-identified patent and that said Letters Patent is hereby corrected as shown below:

On the Title Page

Item [75], reads "Huazhang Zu" should read "Huazhang Yu"

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*